(12) United States Patent
Wallis et al.

(10) Patent No.: US 10,341,906 B2
(45) Date of Patent: Jul. 2, 2019

(54) SYSTEM AND METHOD FOR CIRCUIT SWITCHED FALLBACK IN IMS CENTRALIZED SERVICES

(71) Applicant: MAVENIR SYSTEMS, INC., Richardson, TX (US)

(72) Inventors: Michael Brett Wallis, McKinney, TX (US); Dan Chen, Shenzhen (CN)

(73) Assignee: Mavenir Systems, Inc., Richardson, TX (US)

( * ) Notice: Subject to any disclaimer, the term of this patent is extended or adjusted under 35 U.S.C. 154(b) by 1 day.

(21) Appl. No.: 15/727,734

(22) Filed: Oct. 9, 2017

(65) Prior Publication Data
US 2018/0035335 A1    Feb. 1, 2018

Related U.S. Application Data

(63) Continuation of application No. PCT/CN2015/077899, filed on Apr. 30, 2015.

(51) Int. Cl.
*H04L 29/06* (2006.01)
*H04W 36/00* (2009.01)
(Continued)

(52) U.S. Cl.
CPC ..... *H04W 36/0022* (2013.01); *H04L 65/1016* (2013.01); *H04L 65/1063* (2013.01);
(Continued)

(58) Field of Classification Search
CPC ... H04W 36/0022; H04W 8/06; H04W 60/04; H04W 80/10; H04L 65/1073;
(Continued)

(56) References Cited

U.S. PATENT DOCUMENTS

2010/0260105 A1* 10/2010 Keller ............... H04W 36/0022
370/328
2010/0265884 A1    10/2010 Vikberg et al.
(Continued)

FOREIGN PATENT DOCUMENTS

CN    101933390 A    12/2010
CN    10413760 A    11/2014
(Continued)

OTHER PUBLICATIONS

International Preliminary Report on Patentability and Written Opinion of the International Searching Authority in the corresponding international application No. PCT/CN2015/077899. dated Nov. 9, 2017, 6 pages.
(Continued)

*Primary Examiner* — Jay P Patel
(74) *Attorney, Agent, or Firm* — Ohlandt, Greeley, Ruggiero & Perle, L.L.P.

(57) ABSTRACT

A method of performing CSFB in an IMS comprises receiving, at a TAS, an incoming voice call for a UE attached to an EPS; paging the UE by the first ICS GW; receiving, by a second ICS GW associated with a second CS RAN currently connected to the UE, a Location Update message from the UE, the Location Update message containing a first CSFB indicator; transmitting, by the second ICS GW, a Registration message to the TAS, the Registration message containing a second CSFB indicator in response to the first CSFB indicator in the Location Update message; transmitting, by the TAS, a Cancel message to the first ICS GW; and transmitting, by the TAS, an Invite message to the second ICS GW to complete the voice call with the UE.

23 Claims, 8 Drawing Sheets

(51) Int. Cl.
*H04W 8/06* (2009.01)
*H04W 60/04* (2009.01)
*H04W 80/10* (2009.01)

(52) U.S. Cl.
CPC ...... *H04L 65/1069* (2013.01); *H04L 65/1073* (2013.01); *H04W 8/06* (2013.01); *H04L 65/1006* (2013.01); *H04W 60/04* (2013.01); *H04W 80/10* (2013.01)

(58) Field of Classification Search
CPC ............. H04L 65/1069; H04L 65/1063; H04L 65/1016; H04L 65/1006
See application file for complete search history.

(56) References Cited

U.S. PATENT DOCUMENTS

| | | | |
|---|---|---|---|
| 2011/0002327 A1* | 1/2011 | Dwyer | H04W 48/18 370/352 |
| 2013/0287007 A1 | 10/2013 | Wu et al. | |
| 2014/0051443 A1 | 2/2014 | Diachina et al. | |
| 2014/0064156 A1* | 3/2014 | Paladugu | H04W 36/0022 370/259 |
| 2015/0173123 A1* | 6/2015 | Luessem | H04W 76/36 370/328 |
| 2015/0327124 A1* | 11/2015 | Keller | H04W 36/0022 370/331 |
| 2016/0150497 A1* | 5/2016 | Janosi | H04L 65/1016 455/435.1 |

FOREIGN PATENT DOCUMENTS

| | | |
|---|---|---|
| EP | 2717623 A1 | 4/2014 |
| WO | 2014194961 A1 | 12/2014 |

OTHER PUBLICATIONS

International Search Report dated Feb. 4, 2016 from corresponding PCT/CN2015/077899, pp. 7.

International Written Opinion dated Feb. 4, 2016 from corresponding PCT/CN2015/077899, pp. 5.

3rd Generation Partnership Project; Technical Specification Group 1-23 Services and System Aspects; Circuit Switched(CS) fallback in Evolved Packet System (EPS); Stage 2 (release 12) 3GPP TS 23.272 V12.5.0 Mar. 31, 2015 (Mar. 31, 2015), pp. 100.

3rd Generation Partnership Project; Technical Specification Group Services and System Aspects; IP Multimedia Subsystem (IMS) centralized services; Stage 2 (Release 12) 3GPP Draft; 23292-CSO CR Implemented, 3rd Generation Partnership Project (3GPP), Dec. 19, 2014 (Dec. 19, 2014); XP50961095; Mobile Competence Centre ; 650, Route Des Lucioles ; F-06921 Sophia-Antipolis Cedex, France.

"3rd Generation Partnership Project; 1-15 Technical Specification Group Radio Access Network; Radio Resource Control (RRC); Protocol specification (Release 12)",3GPP Draft; 25331-C58, 3rd Generation Partnership Project (3GPP), Mar. 26, 2015 (2015-83-26)Mobile Competence Centre ; 658, Route Des Lucioles ; F-86921 Sophia-Antipolis Cedex; France.

Extended European Search Report for the corresponding European application EP 15890275.9, dated Oct. 10, 2018, 15 pages.

* cited by examiner

SYSTEM AND METHOD FOR CIRCUIT SWITCHED FALLBACK IN IMS CENTRALIZED SERVICES

CROSS-REFERENCE TO RELATED APPLICATIONS

This application is a continuation of International Application No. PCT/CN2015/077899, filed Apr. 30, 2015, the disclosure of which application is hereby incorporated by reference.

FIELD

The present disclosure relates to a telecommunications system, and more particularly to a system and method for Circuit Switched Fallback (CSFB) in an IMS centralized services (ICS) architecture.

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. A mobile device, also called a User Equipment (UE), may operate in a wireless communication network that provides high-speed data and/or voice communications. The wireless communication networks may implement circuit-switched (CS) and/or packet-switched (PS) communication protocols to provide various services. For example, the UE may operate in accordance with one or more radio technology such as Universal Terrestrial Radio Access (UTRA), Evolved UTRA (E-UTRA), and Global System for Mobile Communications (GSM) as part of an Universal Mobile Telecommunication System (UMTS). UTRA, E-UTRA, GSM, UMTS and LTE (Long Term Evolution) are described in specification documents from 3GPP. These various radio technologies and standards are known in the art.

The Evolved Packet Core (EPC) is the latest evolution of the 3GPP core network architecture first introduced in Release 8 of the standard. In EPC, the user data and the signaling data are separated into the user plane and the control plane. The EPC is composed of four basic network elements: the Serving Gateway (SGW), the Packet Data Network Gateway (PDN GW or PGW), the Mobility Management Entity (MME), and the Home Subscriber Server (HSS). The EPC is connected to external networks, which can include the IP Multimedia Core Network Subsystem (IMS).

The IP Multimedia Subsystem or IP Multimedia Core Network Subsystem (IMS) is an architectural framework for delivering IP multimedia services. Historically, mobile phones have provided voice call services over a switched-circuit-style network, rather than strictly over an IP packet-switched network. Alternative methods of delivering voice or other multimedia services over IP have become available on smartphones (e.g., VoIP), but they have not become standardized across the industry. IMS is an architectural framework to provide standardization. Session Initiation Protocol or SIP is the primary protocol used in IMS.

Long Term Evolution (LTE) is a high-speed high-capacity IP-based data standard for mobile devices. Because LTE systems do not support voice calls, Circuit Switched Fallback (CSFB) specified by 3GPP standards TS 23.272 is executed to handle these voice calls. When a mobile device camped on LTE radio receives a voice call page request over the LTE system, the mobile device must fall back to the CS radio to complete the call.

DETAILED DESCRIPTION

Figure 1:
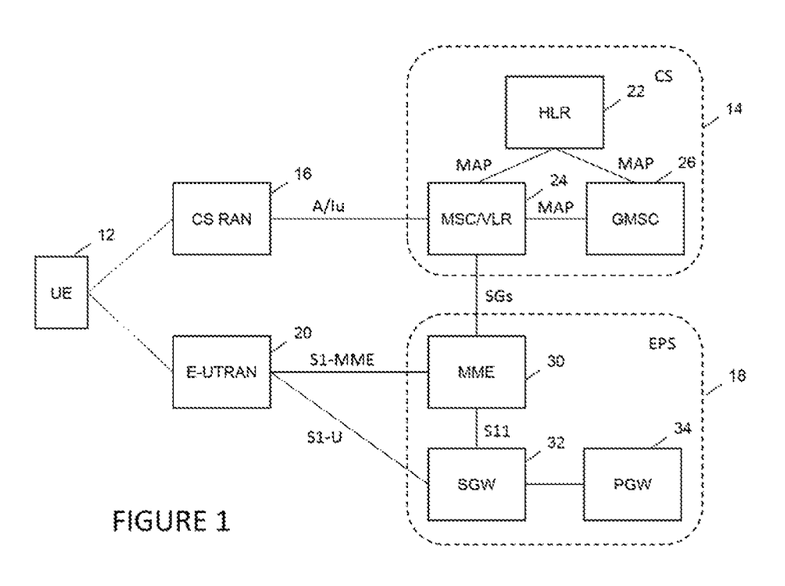
FIG. 1 is a simplified block diagram of an exemplary network architecture for illustrating Circuit Switched Fallback (CSFB)

FIG. 1 is a simplified block diagram for an exemplary embodiment of a telecommunication network for illustrating Circuit Switch Fallback (CSFB). A User Equipment (UE) 12 has access to a Circuit Switched network 14 via a Circuit Switched Radio Access Network (CS RAN) 16, and to an Evolved Packet System (EPS) 18 via an Evolved Universal Terrestrial Radio Access Network (E-UTRAN) 20. The CS system 14 includes a Home Location Register (HLR) 22, a Mobile Switching Center (MSC)/Visitor Location Register (VLR) 24, and a Gateway Mobile Switching Center (GMSC) 26. The HLR 22 is a database from a mobile network in which information from all mobile subscribers is stored. The HLR 22 contains information about the subscriber's identity, his telephone number, the associated services and general information about the location of the subscriber. The MSC 24 is a telephone exchange that makes the connection between mobile users within the network, from mobile users to the public switched telephone network and from mobile users to other mobile networks. The VLR is a database in a mobile communications network associated with the MSC 24. The MSC and VLR may be co-located. The GMSC 26 is a special kind of MSC that serves as the entry point to the mobile network. Whenever a call for a mobile subscriber comes from outside the mobile network, the call is routed through the GMSC. The HLR 22, MSC/VLR, and GMSC are connected via Mobile Application Part (MAP) interfaces. The CS RAN 16 is connected to the CS core network 14 via the A or Iu interface.

The CS core network 14 is coupled to the EPS 18 via an SGs interface. The EPS 18 includes a Mobility Management Entity (MME) 30, a Serving Gateway (SGW) 32, and Packet Data Network Gateway (PDN GW or PGW) 34. The MME 30 is a key node in the control plane that processes signaling related to mobility and security between the UE 12 and the EPS 18. It is involved in the bearer activation/deactivation process and is also responsible for choosing the SGW 32 for a UE at the initial attach. It is also responsible for authenticating the user. Generally, the MME 30 is configured to manage mobile context, session context, and security information of the UE 12. The MME 30 is connected to the SGW via an S11 interface. The SGW and PGW nodes 32 and 34 are in the user plane and transport IP data traffic between the UE 12 and the external networks. All user IP packets are transferred through the SGW 32 and the PGW 34. The SGW 32 is the connection point between the radio-side and the EPS 18, and routes and forwards user IP data packets while also acting as the mobility anchor for the user plane during inter-eNB handovers. For UEs in the idle state, the SGW 24 terminates the down link data path and triggers paging when down link data arrives for the UE. The SGW 32 and PGW 34 may communicate via an S5 or S8 interface. The PGW 34 is the connection point between the EPS 18 and external networks, and provides IP address allocation as well as other functions for the UE 12. The PGW 34 is connected to an operator's external IP networks that may include, for example, the Internet, the Intranet, an IP Multimedia Subsystem (IMS), and a PS Streaming Service (PSS). A UE 12 may have simultaneous connectivity with more than one PGW for accessing multiple Packet Data Networks. The PGW 34 further performs additional functions such as policy enforcement, packet filtering for each user, charging support, lawful interception, and packet screening. The E-UTRAN 20 is connected to the EPS 18 via the S1-u interface.

The term UE is used to refer to a broad range of communication devices now known and to be developed. Examples of an UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a monitoring device for machine-to-machine communication, or any other similar functioning device. The UE 12 is a 2G/3G/4G device. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Currently, some Long Term Evolution (LTE) systems do not support voice calls, so Circuit Switched Fallback (CSFB) specified by 3GPP standards TS23.272 is executed to perform these calls. CS fallback function is realized by reusing Gs interface mechanisms as defined in 3GPP TS 29.018 on the interface between the MME 30 in the EPS 18 and the MSC (Mobile Switching Center)/VLR (Visitor Location Register) 24 in the CS network 14. This interface is called the SGs interface.

Figure 2:
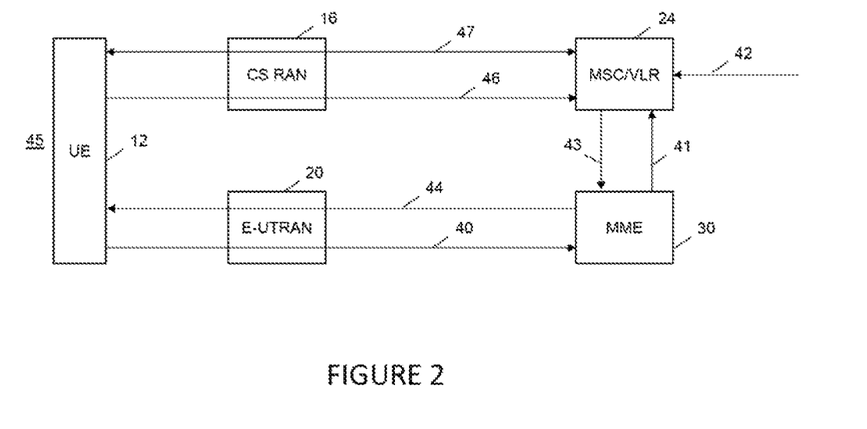
FIG. 2 is a simplified data flow diagram of an exemplary process for Circuit Switched Fallback (CSFB)

FIG. 2 is a simplified data flow diagram of an exemplary process for Circuit Switched Fallback (CSFB). The UE 12 performs a dual EPS/IMSI (International Mobile Subscriber Identity) attach to the EPS (indicated by reference numeral 40). This triggers the MME 30 to perform a location update procedure toward the VLR 24 in the CS network 14 (indicated by reference numeral 41). When an incoming voice call is directed at this UE 12 that is camped on the E-UTRAN 20, the call is delivered to the MSC/VLR 24 (indicated by reference numeral 42). The MSC/VLR 24 pages the UE 12 via the SGs interface between the MME 30 and the MSC/VLR, and via the E-UTRAN 20 (indicated by reference numerals 43 and 44). The UE 12 falls back to the CS RAN 16 (24 (indicated by reference numeral 45) and issues either a Location Update or Page Response (indicated by reference numeral 46). The voice call is completed over the CS RAN 16 (indicated by reference numeral 47).

Figure 3:
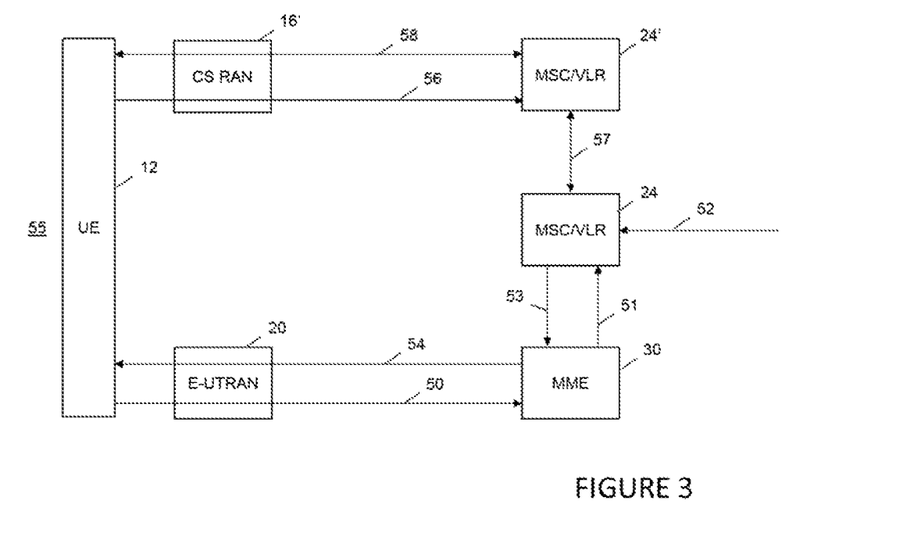
FIG. 3 is a simplified data flow diagram of an exemplary process for Circuit Switched Fallback (CSFB) using Mobile Terminating Roaming Retry (MTRR) or Mobile Terminating Roaming Forward (MTRF)

FIG. 3 is a simplified data flow diagram of an exemplary process for Circuit Switched Fallback (CSFB) using Mobile Terminating Roaming Retry (MTRR) or Mobile Terminating Roaming Forward (MTRF). Continuing with the prior scenario, if the UE 12 falls back to a MSC/VLR different than the one that issued the SGs page, complex procedures called MTRR or MTRF are required to complete the call. As before, the UE 12 performs a dual EPS/IMSI (International Mobile Subscriber Identity) attach to the EPS (indicated by reference numeral 50). This triggers the MME 30 to perform a location update procedure toward the VLR 24 (indicated by reference numeral 51). When an incoming voice call is directed at this UE 12 that is camped on the E-UTRAN 20, the call is delivered to the MSC/VLR 24 (indicated by reference numeral 52). The MSC/VLR 24 pages the UE 12 via the SGs interface between the MME 30 and the MSC/VLR, and via the E-UTRAN 20 (indicated by reference numerals 53 and 54). The UE 12 falls back to the CS RAN 16 (indicated by reference numeral 55). However, in this scenario, the UE falls back to a CS RAN 16' that is connected to a different VLR than the one that sent the page regarding the mobile terminated call. The UE 12 issues either a Location Update or Page Response to the MSC/VLR 24' via the CS RAN 16' (indicated by reference numeral 56). The original MSC/VLR 24 and the new MSC/VLR 24' then perform the MTRR or MTRF procedure to redirect the call to the UE 12 (indicated by reference numeral 57). The voice call is completed over the CS RAN 16' (indicated by reference numeral 58). It should be noted that some details of standard-specified procedures are omitted for the sake of clarity and brevity.

Figure 4:
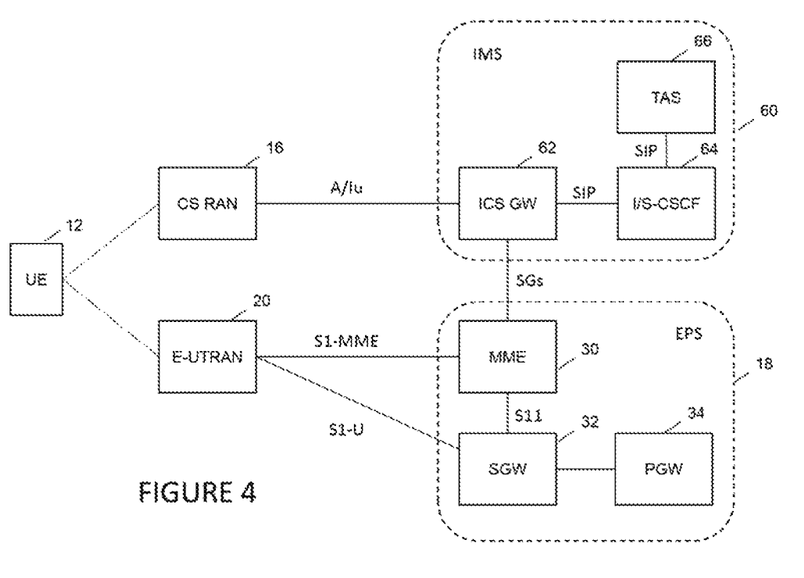
FIG. 4 is a simplified block diagram of an exemplary network architecture for Circuit Switched Fallback (CSFB) in IMS centralized services (ICS) according to the present disclosure.

FIG. 4 is a simplified block diagram of an exemplary network architecture for Circuit Switched Fallback (CSFB) in IMS centralized services (ICS) according to the present disclosure. In this scenario, an IMS infrastructure 60 replaces the CS network. The IMS network 60 includes an IP Multimedia Subsystem Centralized Services (ICS) Gateway (GW) 62 that is coupled to the MME 30 in the EPS 18 via the SGs interface. The ICS GW 62 is coupled to an Interrogating/Serving-Call State Control Function (US-CSCF) 64 via a SIP interface. A Telephony Application Server (TAS) 66 is further coupled to the I/S-CSCF 64 via another SIP interface. The I/S-CSCF 64 play an important role in VoLTE call processing.

Figure 5:
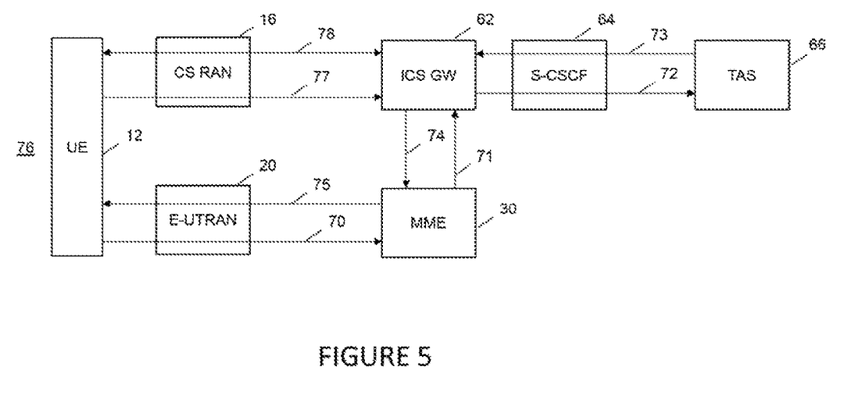
FIG. 5 is a simplified data flow diagram of an exemplary process for Circuit Switched Fallback (CSFB) in IMS centralized services (ICS) according to the present disclosure.

FIG. 5 is a simplified data flow diagram of an exemplary process for Circuit Switched Fallback (CSFB) in IMS centralized services (ICS) according to the present disclosure. The UE 12 performs a dual EPS/IMSI attach to the EPS (indicated by reference numeral 70). This triggers the MME 30 to perform a location update procedure toward the ICS GW 62 (indicated by reference numeral 71), which registers the UE in IMS via the S-CSCF 64 and TAS 66 (indicated by reference numeral 72). When an incoming voice call is directed at this UE 12 that is camped on the E-UTRAN 20, the call is first handled by the TAS 66 and then delivered to the ICS GW 62 (indicated by reference numeral 73). The ICS GW 62 pages the UE 12 via the SGs interface between the MME 30 and the ICS GW 62, and via the E-UTRAN 20 (indicated by reference numerals 74 and 75). The UE 12 falls back to the CS RAN 16 (indicated by reference numeral 76). The UE 12 issues either a Location Update or Page Response to the ICS GW 62 via the CS RAN 16 (indicated by reference numeral 77). The voice call is then completed over the CS RAN 16 (indicated by reference numeral 78).

Figure 6:
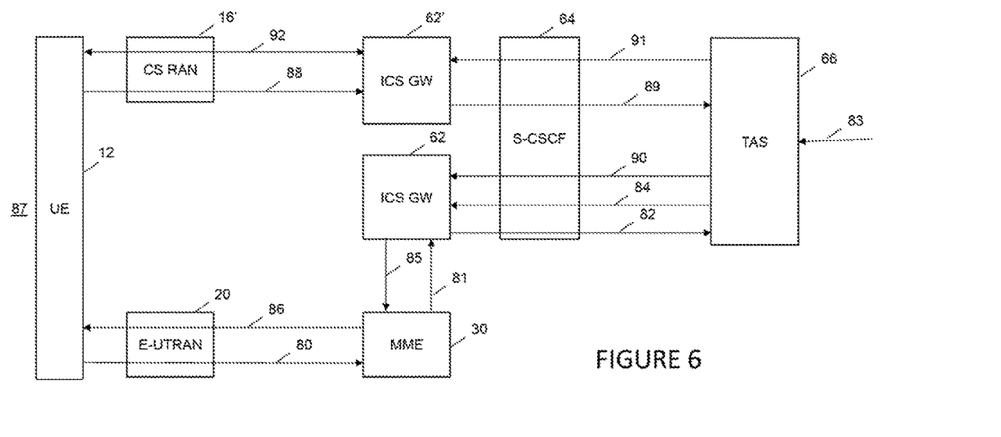
FIG. 6 is a simplified data flow diagram of an exemplary process for Circuit Switched Fallback (CSFB) in IMS centralized services (ICS) where the UE falls back to a CS radio connected to a different ICS GW than the one that sent the page according to the present disclosure.

FIG. 6 is a simplified data flow diagram of an exemplary process for Circuit Switched Fallback (CSFB) in IMS centralized services (ICS) where the UE falls back to a CS radio connected to a different ICS GW according to the present disclosure. As in the previous scenario, the UE 12 performs a dual EPS/IMSI attach to the EPS (indicated by reference numeral 80). This triggers the MME 30 to perform a location update procedure toward the ICS GW 62 (indicated by reference numeral 81), which sends an IMS REGISTER request to the TAS 66 via the S-CSCF 64 (indicated by reference numeral 82). When an incoming voice call is directed at this UE 12 that is camped on the E-UTRAN 20, the call is first handled by the TAS 66, which sends a SIP Invite request to the ICS GW 62 via the S-CSCF 64 (indicated by reference numerals 83 and 84). The ICS GW 62 pages the UE 12 via the SGs interface between the MME 30 and the ICS GW 62, and via the E-UTRAN 20 (indicated by reference numerals 85 and 86).

However, in this scenario, the UE 12 falls back to a different CS RAN 16' that is connected to another ICS GW 62' than the ICS GW 62 that sent the page regarding the incoming voice call. The UE 12 issues either a Location Update or Page Response message to the current ICS GW 62' via the CS RAN 16' (indicated by reference numeral 88). The Location Update or Page Response message includes an indication for a CSFB call. The CSFB indicator may be a flag included in an existing parameter or information element in the message. The ICS GW 62' is configured to recognize the request for a CSFB call because of the CSFB indicator in the Location Update message from the UE, and sends an IMS REGISTER request message that also includes an indication for a CSFB call (indicated by reference numeral 89). The CSFB indicator in the IMS registration message may be a new feature tag, a new SIP header field, or another suitable indication. To avoid overwriting the IMS registration from the prior ICS GW 62, a different registration id (reg-id) should be used when a user is attached to the old ICS GW and new ICS GW. This could be done by either having each ICS GW assigned a unique range of reg-id values for its exclusive use, or each ICS GW uses a different reg-id only when the ICS GW gets a Location Update message from the MME 30. The TAS 66, in response to receiving the second REGISTER request and recognizing that the registration is being triggered for a CSFB call (in response to the CSFB indicator), redirects the call to the current ICS GW 62' to which the UE 12 is presently attached. The TAS 66 also sends a CANCEL request message to the prior ICS GW 62 (indicated by reference numeral 90). Further, the TAS 66 sends a second INVITE request message to the current ICS GW 62' via the S-CSCF 64 for the call (indicated by reference numeral 91). In this manner, the voice call is completed over the CS RAN 16' via the ICS GW 62' (indicated by reference numeral 92). It should be noted that some details of standard-specified procedures are omitted for the sake of clarity and brevity.

Figure 7:
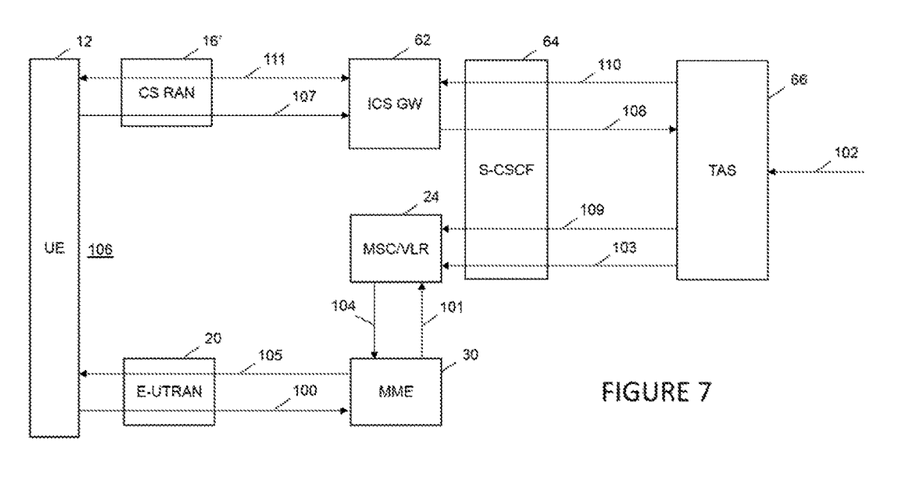
FIG. 7 is a simplified data flow diagram of an exemplary process for Circuit Switched Fallback (CSFB) in IMS centralized services (ICS) where the UE falls back to a CS radio connected to an ICS GW rather than the MSC/VLR that sent the page according to the present disclosure.

FIG. 7 is a simplified data flow diagram of an exemplary process for Circuit Switched Fallback (CSFB) in IMS centralized services (ICS) where the UE falls back to a CS radio connected to a ICS GW instead of the MSC/VLR that sent the page regarding the incoming voice call. As in the previous scenario, the UE 12 performs a dual EPS/IMSI attach to the EPS (indicated by reference numeral 100). This triggers the MME 30 to perform a location update procedure toward the MSC/VLR 24 (indicated by reference numeral 101). When an incoming voice call is directed at this UE 12 that is camped on the E-UTRAN 20, the call is first handled by the TAS 66, which sends a SIP Invite request to the MSC/VLR 24 via the S-CSCF 64 (indicated by reference numerals 102 and 103). The MSC/VLR 24 pages the UE 12 via the SGs interface with the MME 30, and via the E-UTRAN 20 (indicated by reference numerals 104 and 105).

In this scenario, the UE 12 is now connected to a different CS RAN 16' that is connected to an ICS GW 62 rather than the MSC/VLR 24 that sent the page regarding the incoming voice call. The UE 12 thus falls back to the CS RAN 16' (indicated by reference numeral 106). The UE 12 issues a Location Update message to the ICS GW 62 via the CS RAN 16' (indicated by reference numeral 107). The Location Update message includes an indication for a CSFB call. The CSFB indicator may be a flag included in an existing parameter or information element in the message. The ICS GW 62 is configured to recognize the request for a CSFB call because of the CSFB indicator in the Location Update message, and sends an IMS REGISTER request message to the TAS 66 that also includes an indication for a CSFB call (indicated by reference numeral 108). The CSFB indicator in the IMS Registration message may be a new feature tag, a new SIP header field, or another suitable indication. The TAS 66, in response to receiving the REGISTER request and recognizing that the registration is being triggered for a CSFB call (in response to the CSFB indicator), redirects the call to the ICS GW 62 to which the UE 12 is presently attached. The TAS 66 also sends a CANCEL request message to the MSC/VLR 24 (indicated by reference numeral 109). Further, the TAS 66 sends a second INVITE request message to the ICS GW 62 via the S-CSCF 64 for the voice call (indicated by reference numeral 110). In this manner, the voice call is completed over the CS RAN 16' via the ICS GW 62 (indicated by reference numeral 111). It should be noted that some details of standard-specified procedures are omitted for the sake of clarity and brevity.

Figure 8:
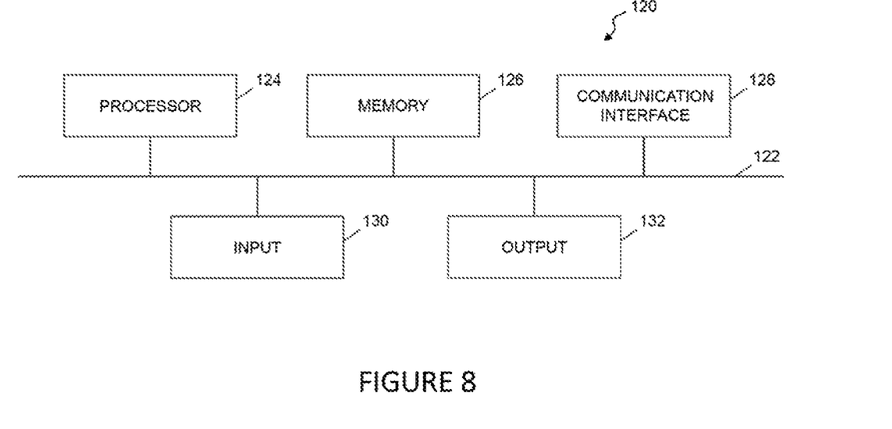
FIG. 8 is a simplified block diagram of an exemplary network node for carrying out methods of Circuit Switched Fallback (CSFB) in IMS centralized services (ICS) according to the present disclosure.

FIG. 8 is a simplified block diagram of an exemplary network node 120 for carrying out the methods described herein. The network node 120 may include a bus 122 interconnecting a processor 124, a memory 126, a communication interface 128, an input device 130, and an output device 132. The bus 122 enables communication among the components of network node 120. The processor 124 may include one or more processing units or microprocessors that interpret and execute coded instructions. In other implementations, the processor 124 may be implemented by or include one or more application-specific integrated circuits (ASICs), field programmable gate arrays (FPGAs), or the like.

The memory 126 may include a random access memory (RAM) or another type of dynamic storage device that stores information and instructions for execution by the processor 124. The memory 126 may also include a read-only memory (ROM) or another type of static storage device that stores static information and instructions for the processor 124. The memory 126 may further include other types of magnetic or optical recording medium and its corresponding drive for storing information and/or instructions. As used herein, the term "memory" is broadly to include registers, buffers, and other data constructs configured to hold data.

The communication interface 128 may include protocol stacks for processing data transmitted via a data protocol now know or to be developed. The communication interface 128 may include transceiver-like devices and antenna that enables the network node 120 to communicate via radio frequency with other devices and/or systems. The communication interface 138 may further include interfaces, ports, or connectors to other devices.

The input 130 may include one or more devices that permit an operator to enter information to the network node 120, such as a keyboard, a keypad, a mouse, a pen, a touch-sensitive pad or screen, a microphone, one or more biometric mechanisms, and the like. The output 132 may include one or more devices that outputs information to the operator, such as a display, a printer port, a speaker, etc.

As described herein, the network node 120 may perform certain operations in response to the processor 124 executing software instructions contained in a computer-readable medium, such as memory 126. A computer-readable medium may be defined as a physical or logical memory device. A logical memory device may include memory space within a single physical memory device or spread across multiple physical memory devices. The software instructions may be read into memory 126 from another computer-readable medium or from another device via a communication interface 108. The software instructions contained in the memory 106 may cause processor 124 to perform processes described herein. Alternatively, hardwired circuitry may be used in place of or in combination with software instructions to implement processes described herein. Thus, implementations described herein are not limited to any specific combination of hardware circuitry and software.

In this disclosure, the term "node" and "function" may be used to refer a physical circuit or collection of hardware components, a logical code module, functionality, and/or a combination of hardware and software entities. Although it is contemplated that the methods described herein reside primarily in the TAS and ICS GW, however, it is contemplated that other suitable network node(s) may carry out these methods.

The features of the present invention which are believed to be novel are set forth below with particularity in the appended claims. However, modifications, variations, and changes to the exemplary embodiments described above will be apparent to those skilled in the art, and the security system and method described herein thus encompasses such modifications, variations, and changes and are not limited to the specific embodiments described herein.

GLOSSARY

3 GPP Third Generation Partnership Project
ASIC Application-Specific Integrated Circuit
CDMA Code Division Multiple Access
CS Circuit Switched
CSFB Circuit Switched Fallback
EPC Evolved Packet Core
EPS Evolved Packet Subsystem
E-UTRAN Evolved UMTS Terrestrial Radio Access Network
FDMA Frequency Division Multiple Access
FPGA Field Programmable Gate Arrays
GMSC Gateway Mobile Switching Center
GPRS General Packet Radio Service
GSM Global System for Mobile Communications
GW Gateway
HLR Home Location Register
HSS Home Subscriber Server
ICS IMS Centralized Services
IMS IP Multimedia Subsystem
IMSI International Mobile Subscriber Identity
IP Internet Protocol
ITU International Telecommunications Union
LTE Long Term Evolution
MAP Mobile Application Part
MME Mobility Management Entity
MSC Mobile Switching Center
MTRF Mobile Terminating Roaming Forward
MTRR Mobile Terminating Roaming Retry
PDA Personal Digital Assistant
PDN GW Packet Data Network Gateway
PGW Packet Data Network Gateway
PS Packet Switched
PSS PS Streaming Service
RAM Random Access Memory
RAN Radio Access Network
ROM Read-Only Memory
SGW Serving Gateway
TDMA Time Division Multiple Access
UE User Equipment
UMTS Universal Mobile Telecommunication System
UTRA Universal Terrestrial Radio Access
UTRAN Universal Terrestrial Radio Access Network
VLR Visitor Location Register

What is claimed is:

1. A method of performing Circuit Switched Fallback (CSFB) in an IP Multimedia Subsystem (IMS), comprising:
    receiving, at a Telephony Application Server (TAS), an incoming voice call for a User Equipment (UE) attached to an Evolved Packet Subsystem (EPS);
    transmitting, by the TAS, an Invite message to a first network node associated with a first Circuit Switched Radio Access Network (CS RAN) connected to the UE;
    paging the UE by the first network node;
    receiving, by a second network node associated with a second CS RAN currently connected to the UE, a Location Update message from the UE, the Location Update message containing a first CSFB indicator;
    transmitting, by the second network node, a Registration message comprising an IMS Registration message to the TAS, the Registration message containing a second CSFB indicator in response to the first CSFB indicator in the Location Update message;
    transmitting, by the TAS, a Cancel message to the first network node, after the step of transmitting the Registration message; and
    transmitting, by the TAS, an Invite message to the second network node to complete the voice call with the UE.

2. The method of claim 1, wherein transmitting, by the TAS, an Invite message to a first network node comprises transmitting an Invite message to a ICS GW associated with the first CS RAN.

3. The method of claim 1, wherein receiving, by a second network node a Location Update message from the UE comprises receiving, by an ICS GW the Location Update message containing the first CSFB indicator from the UE.

4. The method of claim 1, wherein transmitting, by the second network node, a Registration message to the TAS, comprises transmitting, by an ICS GW, the Registration message containing a second CSFB indicator to the TAS.

5. The method of claim 1, wherein transmitting a Registration message by the second network node comprises transmitting a Registration message having a unique reg-id to avoid the Registration message from the second network node to overwrite a previous IMS registration from the first network node.

6. The method of claim 1, wherein transmitting a Registration message comprises transmitting a Registration message having a new SIP header to indicate a CSFB call.

7. The method of claim 1, wherein transmitting a Registration message comprises transmitting a Registration message having a pre-existing message parameter to indicate a CSFB call.

8. The method of claim 1, wherein transmitting a Location Update message comprises transmitting a Location Update message having a pre-existing message parameter to indicate a CSFB call.

9. A method of performing Circuit Switched Fallback (CSFB) in an IP Multimedia Subsystem (IMS), comprising:
receiving, at a Telephony Application Server (TAS), an incoming voice call for a User Equipment (UE) attached to an Evolved Packet Subsystem (EPS);
transmitting, by the TAS, an Invite message to a first network node associated with a first Circuit Switched Radio Access Network (CS RAN) connected to the UE;
paging the UE by the first network node;
receiving, by a second network node associated with a second CS RAN currently connected to the UE, a Location Update message from the UE, the Location Update message containing a first CSFB indicator;
transmitting, by the second network node, a Registration message to the TAS, the Registration message containing a second CSFB indicator in response to the first CSFB indicator in the Location Update message;
transmitting, by the TAS, a Cancel message to the first network node; and
transmitting, by the TAS, an Invite message to the second network node to complete the voice call with the UE;
wherein transmitting, by the TAS, an Invite message to a first network node comprises transmitting an Invite message to a MSC/VLR associated with the first CS RAN.

10. A method of performing Circuit Switched Fallback (CSFB) in an IP Multimedia Subsystem (IMS), comprising:
receiving, by a gateway network node associated with a Circuit Switched Radio Access Network (CS RAN) currently connected to a User Equipment (UE), a first message to update its location from the UE containing a first CSFB indicator;
transmitting, by the current gateway network node, a second message comprising an IMS Registration message to register the UE to an application server node handling an incoming voice call for the UE, the second message containing a second CSFB indicator in response to the first CSFB indicator in the first message;
transmitting, by the application server node, a third message to a prior gateway network node associated with a prior CS RAN previously connected to the UE to cancel a prior pending invite request in response to the second CSFB indicator in the second message; and
transmitting, by the application server node, a fourth message to the current gateway network node to complete the voice call with the UE.

11. The method of claim 10, wherein transmitting an IMS Registration message comprises transmitting an IMS Registration message having a unique reg-id assigned to avoid the IMS Registration message from the current gateway network node to overwrite a previous IMS registration from the prior gateway network node.

12. The method of claim 10, wherein transmitting an IMS Registration message comprises transmitting an IMS Registration message having a new SIP header.

13. The method of claim 10, wherein transmitting an IMS Registration message comprises transmitting an IMS Registration message having a pre-existing message parameter to indicate a CSFB call.

14. The method of claim 10, wherein transmitting a Location Update message comprises transmitting a Location Update message having a pre-existing message parameter to indicate a CSFB call.

15. A non-transitory computer-readable medium having encoded therein a method of performing Circuit Switched Fallback (CSFB) in an IP Multimedia Subsystem (IMS), the method comprising:
receiving, by a first network node associated with a current Circuit Switched Radio Access Network (CS RAN) connected to a User Equipment (UE), a Location Update message from the UE containing a first CSFB indicator;
transmitting, by the first network node, a Registration message comprising an IMS Registration message to a Telephony Application Server (TAS) handling an incoming voice call for the UE, the Registration message containing a second CSFB indicator in response to the first CSFB indicator in the Location Update message;
transmitting, by the TAS, a Cancel message to a second network node associated with a prior CS RAN previously connected to the UE in response to the second CSFB indicator in the Registration message; and
transmitting, by the TAS, an Invite message to the first network node to complete the voice call with the UE.

16. The method of claim 15, wherein receiving, by a first network node associated with a current Circuit Switched Radio Access Network (CS RAN) connected to a User Equipment (UE), a Location Update message comprises receiving, by a current IMS Centralized Services Gateway (ICS GW) associated with a current Circuit Switched Radio Access Network (CS RAN) connected to a User Equipment (UE), a Location Update message containing the first CSFB indicator from the UE.

17. The method of claim 15, wherein transmitting, by the first network node, a Registration message to a Telephony Application Server (TAS) comprises transmitting, by a current IMS Centralized Services Gateway (ICS GW), a Registration message to a Telephony Application Server (TAS) handling an incoming voice call for the UE, the Registration message containing a second CSFB indicator in response to the first CSFB indicator in the Location Update message.

18. The method of claim 15, wherein transmitting, by the TAS, a Cancel message comprises transmitting, by the TAS, a Cancel message to a prior IMS Centralized Services Gateway (ICS GW) associated with a prior CS RAN previously connected to the UE in response to the second CSFB indicator in the Registration message.

19. The method of claim 15, wherein transmitting a Registration message comprises transmitting a Registration message having a unique reg-id assigned to avoid the Registration message from the first network node to overwrite a previous IMS registration from the second network node.

20. The method of claim 15, wherein transmitting a Registration message comprises transmitting a Registration message having a new SIP header.

21. The method of claim 15, wherein transmitting a Registration message comprises transmitting a Registration message having a pre-existing message parameter to indicate a CSFB call.

22. The method of claim 15, wherein transmitting a Location Update message comprises transmitting a Location Update message having a pre-existing message parameter to indicate a CSFB call.

23. A telecommunication network node configured to coordinate Circuit Switched Fallback (CSFB) in an IP Multimedia Subsystem (IMS), comprising:
   receiving, at a Telephony Application Server (TAS), an incoming voice call for a User Equipment (UE) attached to an Evolved Packet Subsystem (EPS);
   transmitting, by the TAS, an Invite message to a first network node associated with a first Circuit Switched Radio Access Network (CS RAN) connected to the UE;
   receiving, by the TAS, a Registration message comprising an IMS Registration message from a second network node currently associated with a second CS RAN, the Registration message containing a CSFB indicator indicating a CSFB voice call;
   transmitting, by the TAS, a Cancel message to the first network node, after receiving the Registration message; and
   transmitting, by the TAS, an Invite message to the second network node to complete the voice call with the UE.

* * * * *